United States Patent
Nishimori

(10) Patent No.: US 7,595,621 B2
(45) Date of Patent: Sep. 29, 2009

(54) DC-DC CONVERTER CONTROL CIRCUIT AND DC-DC CONVERTER CONTROL METHOD

(75) Inventor: Eiji Nishimori, Kasugai (JP)

(73) Assignee: Fujitsu Microelectronics Limited, Tokyo (JP)

(*) Notice: Subject to any disclaimer, the term of this patent is extended or adjusted under 35 U.S.C. 154(b) by 0 days.

(21) Appl. No.: 11/390,133

(22) Filed: Mar. 28, 2006

(65) Prior Publication Data

US 2007/0139027 A1    Jun. 21, 2007

(30) Foreign Application Priority Data

Dec. 20, 2005   (JP) .............................. 2005-367136

(51) Int. Cl.
*G05F 1/575* (2006.01)
(52) U.S. Cl. .................. 323/284; 323/285; 323/286
(58) Field of Classification Search .............. 323/224, 323/283, 282, 288, 285, 284, 286
See application file for complete search history.

(56) References Cited

U.S. PATENT DOCUMENTS 6,064,187 A * 5/2000 Redl et al. ................. 323/285
6,147,478 A * 11/2000 Skelton et al. .............. 323/288
6,246,220 B1 * 6/2001 Isham et al. ................ 323/224
6,956,359 B2 * 10/2005 Dubhashi ................... 323/282
7,233,135 B2 * 6/2007 Noma et al. ................ 323/285
2005/0067363 A1   3/2005 Noma et al.

FOREIGN PATENT DOCUMENTS

| JP | 10-225105 A | 8/1998 |
|----|-------------|--------|
| JP | 2000-032744 A | 1/2000 |
| JP | 2000-287439 A | 10/2000 |

* cited by examiner

*Primary Examiner*—Akm E Ullah
*Assistant Examiner*—Harry Behm

(57) ABSTRACT

In a DC-to-DC converter control circuit and control method thereof, an arithmetic circuit for outputs an add-up signal generated by adding an output voltage signal obtained by adding an output voltage of a DC-to-DC converter and an AC current signal obtained according to an AC current component of a coil current, and a comparator compares the add-up signal with a reference signal. Switching control is executed according to a result of the comparison by the comparator. By the control circuit and method, variations in the coil current due to a change in load may be reliably captured by comparing the add-up signal with the reference signal, and compatibility between low ripple voltage characteristics and stable and fast response to sudden changes in load may be achieved.

18 Claims, 8 Drawing Sheets

CIRCUIT DIAGRAM FOR DESCRIBING FIRST PRINCIPLE OF INVENTION

FIG. 1 CIRCUIT DIAGRAM FOR DESCRIBING FIRST PRINCIPLE OF INVENTION

FIG. 2 CIRCUIT DIAGRAM SHOWING FIRST EMBODIMENT

FIG. 3 CIRCUIT DIAGRAM FOR DESCRIBING SECOND PRINCIPLE OF INVENTION

FIG. 4 CIRCUIT DIAGRAM SHOWING SECOND EMBODIMENT

FIG. 5  CIRCUIT DIAGRAM ACCORDING TO FIRST VARIATION EXAMPLE OF SECOND EMBODIMENT

FIG. 6 CIRCUIT DIAGRAM ACCORDING TO SECOND VARIATION EXAMPLE OF SECOND EMBODIMENT

CIRCUIT DIAGRAM (1) SHOWING BACKGROUND TECHNOLOGY

CIRCUIT DIAGRAM (2) SHOWING BACKGROUND TECHNOLOGY

DC-DC CONVERTER CONTROL CIRCUIT AND DC-DC CONVERTER CONTROL METHOD

CROSS-REFERENCE TO RELATED APPLICATIONS

This application is based upon and claims the benefit of priority from each of the prior Japanese Patent Application No. 2005-367136 filed on Dec. 20, 2005, the entire contents of which are incorporated herein by reference.

BACKGROUND OF THE INVENTION

1. Field of the Invention

The invention relates to a DC-to-DC converter control circuit having fast response characteristics against a sudden change in load, and a DC-to-DC converter control method using the same, and in particular, to a DC-to-DC converter control circuit aiming at compatibility with low ripple voltage characteristics, and a DC-to-DC converter control method using the same.

2. Description of the Related Art

FIG. 7 shows a current control type DC-to-DC converter circuit. It has a configuration wherein switching control by a synchronous rectification method is executed by a main transistor FET1 and a synchronous transistor FET2, interconnecting an input voltage VIN and the ground potential.

With a DC-to-DC converter control circuit 100, input terminals CS1, and FB1, connected with respective ends of a sense resistor RS, are connected to a noninverting input terminal, and an inverting input terminal of a level converter A100, respectively, and when a coil current flowing through a choke coil L1 is inputted thereto as voltage signals, a difference signal thereof is amplified to be outputted in a necessary voltage range (a voltage signal VP). Further, a voltage difference between an output voltage VOUT inputted from the input terminal FB1 connected to an output terminal VOUT, and a reference voltage E1 undergoes error amplification by an error amplifier E100 (an error amplification signal VC). The voltage signal VP, and the error amplification signal VC are inputted to a noninverting input terminal, and an inverting input terminal of a voltage comparator CMP2, respectively. A flip-flop circuit FF2 as set by a high-level signal from an oscillator C1 causes the main transistor FET1 to be turned into conductive state via an output terminal DH. As a result, the coil current increases, and an output of the voltage comparator CMP2 is inverted to a high-level, thereby resetting the flip-flop circuit FF2. This causes the synchronous transistor FET2 to be turned into conductive state via an output terminal DL. There is adopted a frequency fixing method whereby such an operation as above is repeated at the cycle of the oscillator O1.

When the main transistor FET1 is in conductive state, the coil current flows from the input voltage VIN toward the output terminal VOUT via the choke coil L1, and increases with time. Since the level converter A100 amplifies the coil current converted into voltage by the sense resistor RS, the voltage signal VP outputted from the level converter A100 increases in magnitude as the coil current increases. The voltage comparator CMP2 resets the flip-flop circuit FF2 upon the voltage signal VP becoming larger in magnitude than the error amplification signal VC. This will turn the main transistor FET1 into non-conductive state while turning the synchronous transistor FET2 into conductive state.

With a DC-to-DC converter control circuit shown in FIG. 8, it is possible to aim at fast response against a sudden change in load. This is a control by the so-called comparator control method. Herein, resistance ESR connected in series to a smoothing capacitor C1 indicates an equivalent series-connected resistance ESR included in the smoothing capacitor C1.

An output voltage VOUT is connected to an input terminal FB1 of a DC-to-DC converter control circuit 200 to undergo resistance type voltage division, thereby being inputted to an inverting input terminal of a voltage comparator CMP1. A reference voltage E1 is connected to a noninverting input terminal of the voltage comparator CMP1. An output terminal of the voltage comparator CMP1 is connected to a set terminal of a flip-flop circuit FF1. The flip-flop circuit FF1 adopts a fixed pulse width method whereby a one shot high-level signal is outputted from a noninverting output terminal Q against setting input. The noninverting output terminal Q, an inverting output terminal /Q of the flip-flop circuit FF1 are connected to a main transistor FET1, and a synchronous transistor FET2 via output terminals DH, DL, respectively.

When the output voltage VOUT drops below the reference voltage E1, the voltage comparator CMP1 outputs a high-level signal to thereby set the flip-flop circuit FF1. In response to setting of the flip-flop circuit FF1, the main transistor FET1 is turned into conductive state, and a current is supplied from an input voltage VIN to a load via a choke coil L1, whereupon the output voltage VOUT of the DC-to-DC converter increases. With the elapse of predetermined time, the flip-flop circuit FF1 is reset, and the synchronous transistor FET2 is turned into conductive state. Energy stored in the choke coil L1 is supplied to the load via the synchronous transistor FET2, but a current flowing through the choke coil L1 gradually decreases as the energy is discharged, and the output voltage VOUT of the DC-to-DC converter also gradually decreases. When the output voltage VOUT drops below the reference voltage E1, the voltage comparator CMP1 outputs a high-level signal again to thereby set the flip-flop circuit FF1. The operation described as above is repeated.

Patent Documents 1 to 3, concerning the technologies related to the above, have since been disclosed.

[Patent Document 1]

Japanese unexamined patent publication No. H10(1998)-225105

[Patent Document 2]

Japanese unexamined patent publication No. 2000-287439

[Patent Document 3]

Japanese unexamined patent publication No. 2000-32744

SUMMARY OF THE INVENTION

With the current control type DC-to-DC converter control circuit 100 shown in FIG. 7, however, there is the risk of occurrence of malfunction such as double pulsing, and so on, unless the frequency characteristics of the error amplifier E100 are on the order of $1/10$ to $1/20$ of the switching frequency of, for example, the main transistor FET1 and the synchronous transistor FET2, because a peak current value of the coil current is controlled according to the error amplification signal VC outputted from the error amplifier E100. That is, unless a feedback response frequency band according to the output voltage VOUT is sufficiently lowered in comparison with the switching frequency, there is the risk of an abnormal switching action taking place. Accordingly, there is the likelihood that it is not possible to make fast response to a sudden change in load, thus posing a problem.

Accordingly, if the DC-to-DC converter control circuit 200 of the comparator control method, shown in FIG. 8, is adopted, since the voltage comparator CMP1 directly compares the output voltage VOUT with the reference voltage E1 to thereby instantly turn the main transistor FET1 into conductive state, so that fast response against a sudden change in load can be implemented.

However, with the DC-to-DC converter control circuit 200, a switching action is executed by detecting a ripple voltage present in the output voltage VOUT, so that in the case of using a capacitor low in the equivalent series-connected resistance ESR as the smoothing capacitor C1 owing to requirements for reduction of an output ripple voltage, there is the likelihood that it becomes difficult to detect variation in the output voltage VOUT, due to a low ripple voltage, thereby raising the risk of rendering switching control unstable, thus posing a problem.

Furthermore, with the DC-to-DC converter control circuit 200, although fast response against the sudden change in load is enabled, a condition of fast response continues even in a stage where a transient response accompanying the sudden change in load comes to an end, so that there is the likelihood that the output voltage of the DC-to-DC converter overshoots a target voltage, subsequently causing a ringing phenomenon, which is a problem. In addition, since the comparator control method is in principle the fixed pulse width method, there is another problem that it becomes difficult to implement the frequency fixing method easy in establishing countermeasures against noise.

The invention has been developed in view of background technologies described, and it is an object of the invention to provide a DC-to-DC converter control circuit capable of implementing compatibility between low ripple voltage characteristics, and stable and fast response characteristics at the time of a sudden change in load, and a DC-to-DC converter control method using the same.

To achieve the purpose above, there is provided A DC-to-DC converter control circuit comprising: an arithmetic circuit for outputting an add-up signal of an output voltage signal obtained according to an output voltage of a DC-to-DC converter, and an AC current signal obtained according to an AC current component of a coil current; and a comparator for comparing the add-up signal with a reference signal, wherein switching control is executed according to a result of comparison by the comparator.

With a DC-to-DC converter control circuit according to the invention, an add-up signal of an output voltage signal obtained according to an output voltage of a DC-to-DC converter, and an AC current signal obtained according to an AC current component of a coil current is outputted from an arithmetic circuit, and the add-up signal is compared with a reference signal by a comparator. Switching control of the DC-to-DC converter is executed according to a result of comparison.

A DC-to-DC converter control method according to the invention comprises: an addition step for adding an output voltage signal obtained according to an output voltage of a DC-to-DC converter to an AC current signal obtained according to an AC current component of a coil current; a comparison step for comparing an addition result of the addition step with a reference signal; and a step for executing switching control according to a comparison result of the comparison step.

With a DC-to-DC converter control method according to the invention, an add-up signal of an output voltage signal obtained according to an output voltage of a DC-to-DC converter, and an AC current signal obtained according to an AC current component of a coil current is outputted, and the add-up signal is compared with a reference signal. Switching control of the DC-to-DC converter is executed according to a result of comparison.

Accordingly, even if an equivalent series-connected resistance ESR of a smoothing capacitor, connected to an output terminal of the DC-to-DC converter, is reduced, and a voltage ripple superimposed on the output voltage becomes very small in value, it is possible to detect variation in the coil current of the DC-to-DC converter, thereby obtaining an add-up signal obtained by adding a variation component of the coil current to the output voltage. By comparing the add-up signal with a reference signal, variation in the coil current, due to a change in load, can be captured with reliability.

Because the add-up signal is outputted according to the variation component of the coil current IL, there is an increase in difference between the add-up signal and the reference signal in the initial stage of a sudden change in load, so that switching control rapidly responding to the sudden change in load is executed. It is possible to rapidly cope with a change in the coil current, and deviation of the output voltage from a target voltage, accompanying a change in load, in rapid response to a steep change in load.

As switching control rapidly responding to the sudden change in load is executed, and the coil current, and the output voltage approach respective target values, so decreased is a difference between the add-up signal and the reference signal, and transient switching control undergoes gradual convergence by degrees. In coincidence with reaching a steady state, the transient switching control comes to an end, thereby enabling a phenomenon of the output voltage overshooting in a reverse direction, accompanied by a ringing phenomenon of the output voltage to be prevented.

The above and further objects and novel features of the invention will more fully appear from the following detailed description when the same is read in connection with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

Embodiments of a DC-to-DC converter control circuit, and a DC-to-DC converter control method, according to the invention, are described in detail hereinafter with reference to the accompanying drawings of FIGS. 1 to 6.

Figure 1:
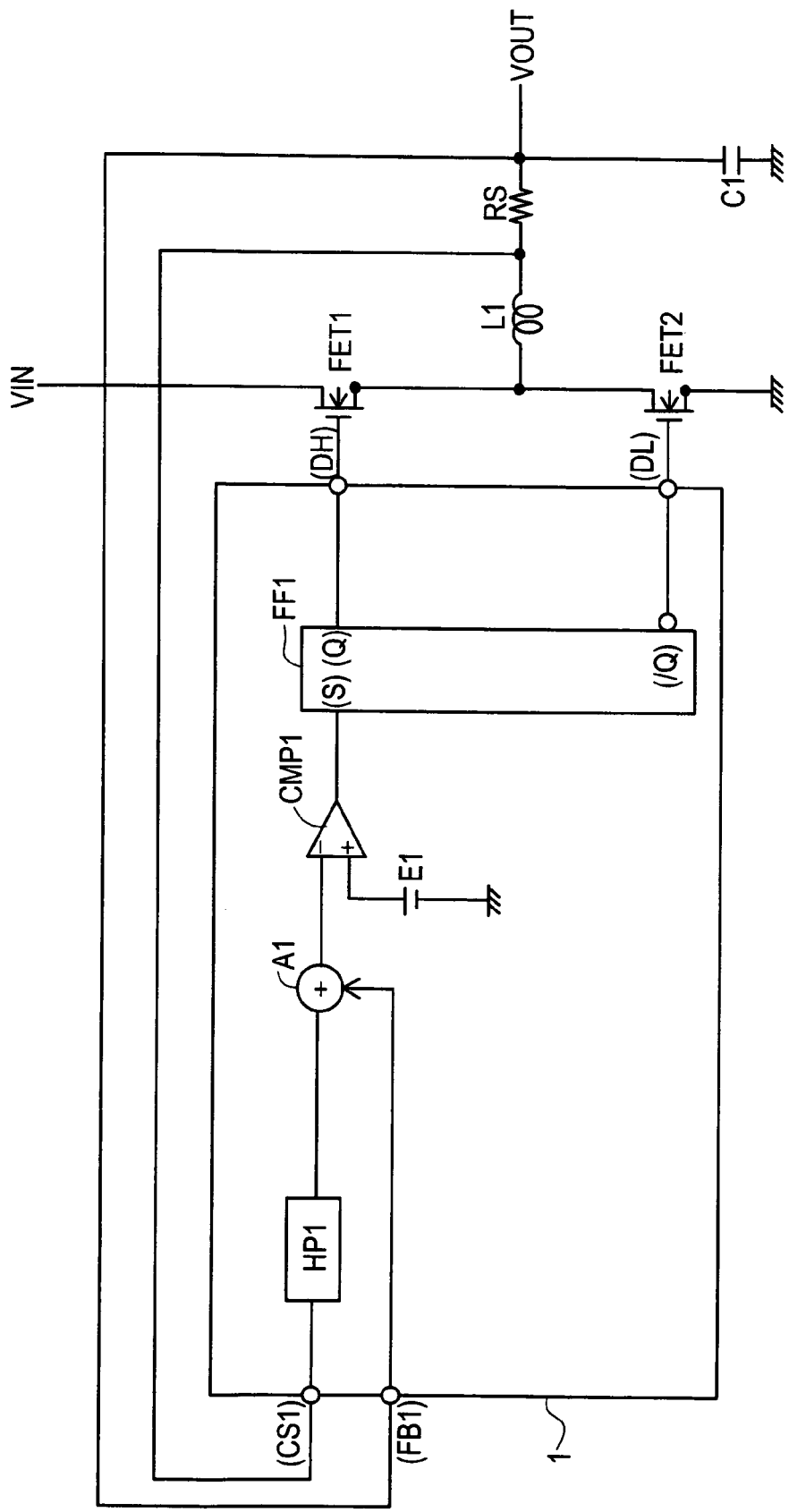
FIG. 1 is a circuit diagram for describing a first principle of the invention.

FIG. 1 is a circuit diagram for describing a first principle of the invention, being a principle circuit diagram of a voltage-drop type DC-to-DC converter having a configuration for the synchronous rectification method by way of example. More specifically, a main transistor FET1 is connected in series to a synchronous transistor FET2 between an input power source VIN and the ground potential, and one end of a choke coil L1 is connected to a connection node between the main transistor FET1 and the synchronous transistor FET2. The other end of the choke coil L1 is connected to an output terminal VOUT via a sense resistor RS. A smoothing capacitor C1 is coupled between the output terminal VOUT and the ground potential.

With a DC-to-DC converter control circuit 1 controlling switching of the main transistor FET1 and the synchronous transistor FET2, the fixed pulse width method that is the same as the comparator control method is shown by way of example. A one-shot flip-flop circuit FF1 has a Q output terminal (Q) connected to a gate terminal of the main transistor FET1 via an output terminal (DH). A /Q output terminal (/Q) of the flip-flop circuit FF1 is connected to a gate terminal of the synchronous transistor FET2 via an output terminal (DL). The one-shot flip-flop circuit FF1 outputs a high-level signal from the Q output terminal (Q) and a low-level signal from the /Q output terminal (/Q) for predetermined time according to a high-level signal inputted to a set terminal (S).

A connection node between the choke coil L1, and the sense resistor RS is connected to a high-pass filter HP1 via an input terminal (CS1), and the high-pass filter HP1 is connected to an adder A1. The output terminal VOUT is connected to the adder A1 via an input terminal (FB1). The adder A1 is connected to an inverting input terminal of a comparator CMP1. A reference voltage E1 is connected to a noninverting input terminal of the comparator CMP1. The comparator CMP1 has an output terminal connected to the set terminal (S) of the one-shot flip-flop circuit FF1.

With the voltage-drop type DC-to-DC converter shown in FIG. 1, a current path from the input power source VIN to the output terminal VOUT is formed due to the main transistor FET1 being in conductive state, and upon an increase in a coil current flowing through the current path increases, electromagnetic energy is accumulated in the choke coil L1. A current path from the ground potential to the output terminal VOUT is formed due to the synchronous transistor FET2 being in conductive state, and upon decrease in the coil current flowing through the current path, the electromagnetic energy accumulated in the choke coil L1 is discharged toward the output terminal VOUT. Repetition of such a switching action results in repetition of an operation to increase or decrease the coil current.

Increase/decrease in the coil current are detected by the sense resistor RS. A voltage signal inputted to the input terminal (CS1) is a voltage signal obtained by superimposing a DC signal component of the coil current and an AC signal component of the coil current, undergoing increase/decrease variations, as converted into voltage by the sense resistor RS, on an output voltage VOUT that is a DC signal component. The voltage signal is inputted to the high-pass filter HP1, thereby outputting the AC signal component, that is, only a variation component of the coil current. The adder A1 adds up the output voltage VOUT that is the DC signal component, and the variation component of the coil current that is the AC signal component. Switching control is executed by comparing an add-up signal with the reference voltage E1.

In this connection, the reference voltage E1 represents, for example, a target voltage for the output voltage VOUT. In FIG. 1 showing the first principle of the invention, the switching control is executed such that a bottom value of the add-up signal coincides with the reference voltage E1. The bottom value of the add-up signal represents a value at which the variation component of the coil current, that is, the AC signal component becomes the minimum, in other words, a value of the output voltage VOUT that is the DC signal component. The switching control is executed such that the output voltage VOUT is maintained at the reference voltage E1.

With the DC-to-DC converter control circuit 1, since the variation component of the coil current is extracted as the AC signal component by the high-pass filter HP1, the DC signal component can be removed out of the coil current flowing through the choke coil L1. Further, the output voltage VOUT as the DC signal component is added to the AC signal component, so that the switching control can be executed by comparing the voltage signal varying according to the coil current on the basis of the output voltage VOUT as a bottom voltage with the reference voltage E1. Even in the case where the smoothing capacitor C1 has the equivalent series-connected resistance ESR at a very small value, and a ripple voltage is reduced, the switching control can be implemented with accuracy by detecting the variation component of the coil current.

Figure 2:
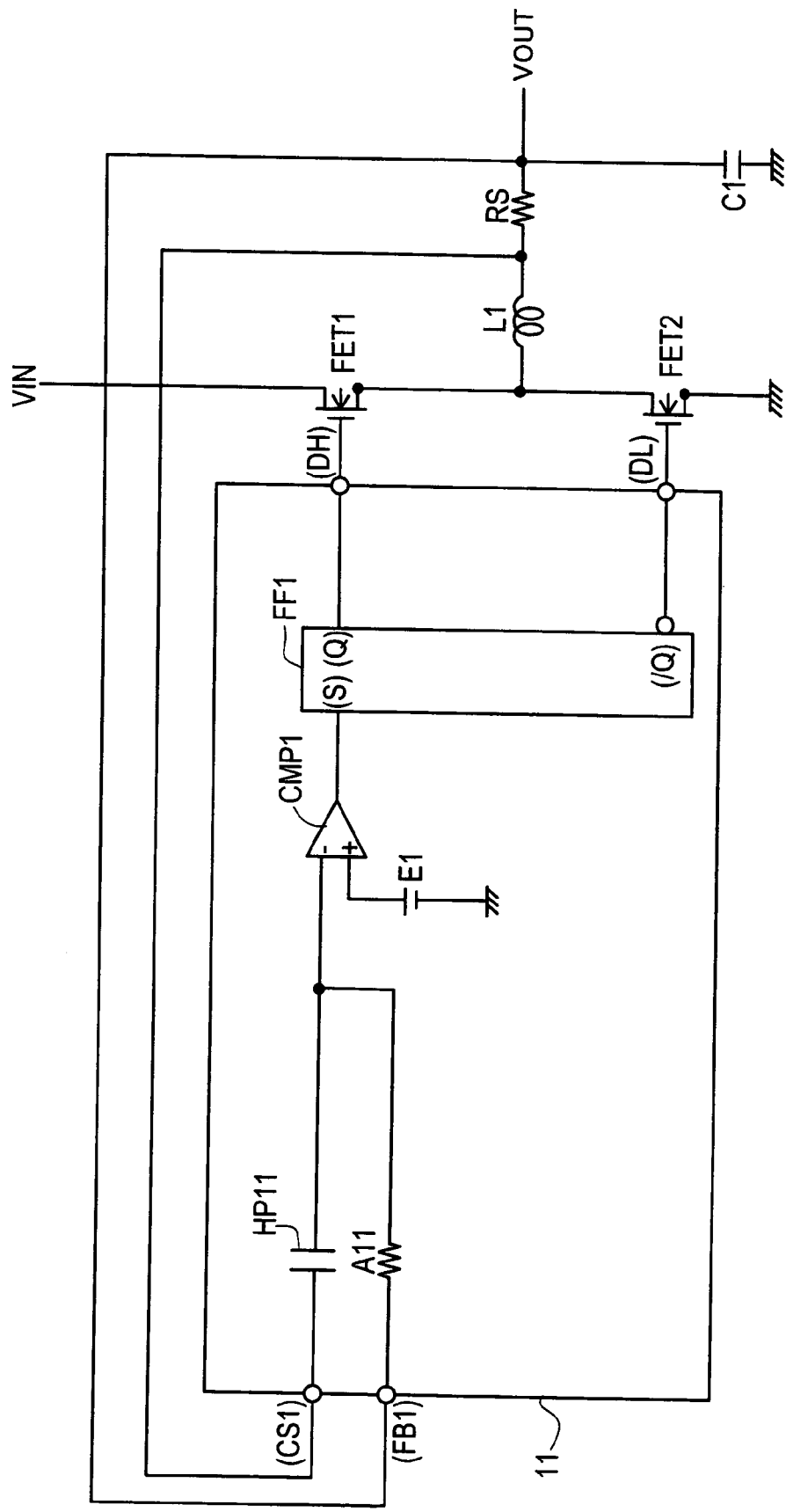
FIG. 2 is a circuit diagram showing a first embodiment of the invention, embodying the first principle.

FIG. 2 shows a circuit diagram of a first embodiment of the invention, embodying the first principle shown in FIG. 1. With a DC-to-DC converter control circuit 11, a high-pass filter capacitor HP11 as a specific example of the high-pass filter HP1 is provided between an input terminal (CS1), and an inverting input terminal of a comparator CMP1. Further, an add-up resistor A11 doubling as a constituent element of a high-pass filter is provided between an input terminal FB1, and the inverting input terminal of the comparator CMP1.

The add-up resistor A11 represents a specific example of the adder A1. A variation component of a coil current, that is, an AC signal component of a signal inputted from the input terminal CS1, passing through the high-pass filter capacitor HP11, is inputted from the input terminal FB1 to be added to an output voltage VOUT, that is, a DC signal component, passing through the add-up resistor A11. A high-pass filter bandwidth is dependent on HP11, and A11.

An add-up signal obtained by adding the variation component of the coil current to the output voltage VOUT is inputted to the inverting input terminal of the comparator CMP1. Herein, a bottom value of the add-up signal represents a value at which the variation component of the coil current becomes the minimum. In other words, the output voltage VOUT is compared with the reference voltage E1.

Figure 3:
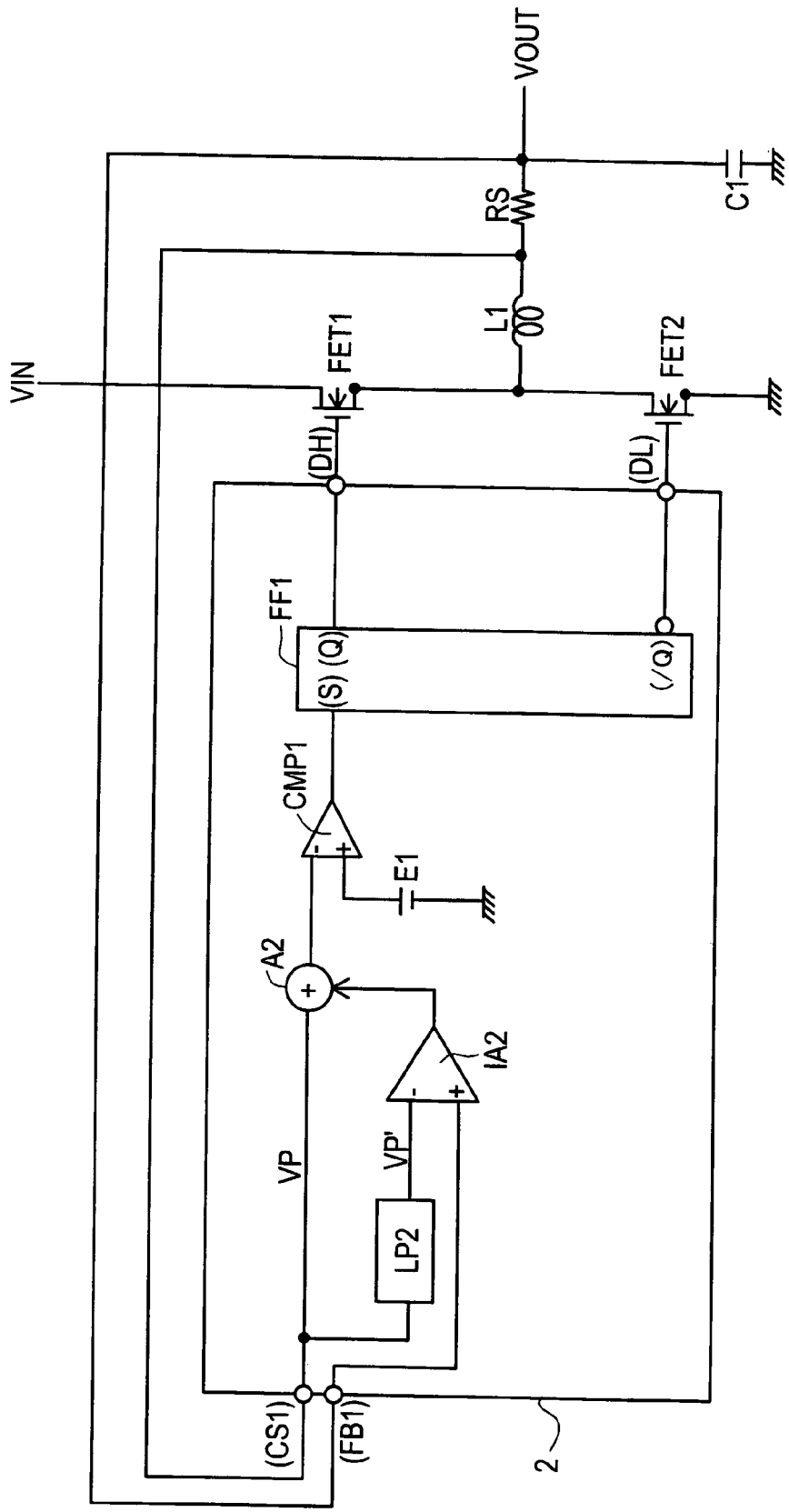
FIG. 3 is a circuit diagram for describing a second principle of the invention.

FIG. 3 is a circuit diagram for describing a second principle of the invention. A main transistor FET1, synchronous transistor FET2, choke coil L1, sense resistor RS, and smoothing capacitor C1, making up a DC-to-DC converter, are the same as those corresponding thereto, respectively, in the case of the first principle (FIG. 1), each having the same relationship in mutual connection and the same function. Accordingly, description thereof is omitted herein.

A DC-to-DC converter control circuit 2 is similar in configuration to the DC-to-DC converter control circuit 1 (FIG. 1), and the comparator control method is shown by way of example. Relationship in connection to respective input terminals (CS1), and (FB1), and respective output terminals (DH), (DL) is the same as in the case of the first principle (FIG. 1). With the DC-to-DC converter control circuit 2, a one shot flip-flop circuit FF1, comparator CMP1, and reference voltage E1 are the same as those corresponding thereto, respectively, in the case of the first principle (FIG. 1), each having the same relationship in mutual connection and the same function. Accordingly, description thereof is omitted herein.

The DC-to-DC converter control circuit 2 is provided with a low-pass filter LP2, an inverting amplifier IA2, and an adder A2 in place of the high-pass filter HP1, and the adder A1 in the case of the DC-to-DC converter control circuit 1 (FIG. 1). A subtraction circuit is made up of the inverting amplifier IA2, and the adder A2.

The input terminal (CS1) is connected to the adder A2, and the low-pass filter LP2 while the input terminal (FB1) is connected to a noninverting input terminal of the inverting amplifier IA2. An inverting input terminal of the inverting amplifier IA2 is connected to the low-pass filter LP2, and an output terminal of the inverting amplifier IA2 is connected to the adder A2. An output terminal of the adder A2 is connected to an inverting input terminal of the comparator CMP1.

A voltage signal VP obtained by superimposing DC and AC signal components of a coil current on an output voltage VOUT, inputted from the input terminal (CS1), is inputted to the low-pass filter LP2, thereby outputting a reference voltage signal VP' used for detecting a variation component of the coil current. It is a signal serving as a reference when estimating the variation component of the coil current. The low-pass filter LP2 has a function of outputting a signal obtained by removing the variation component of the coil current that is the AC signal component out of the voltage signal VP inputted from the input terminal (CS1).

The reference voltage signal VP' is inputted to an inverting input terminal of the inverting amplifier IA2, and is inverted against the output voltage VOUT inputted to the noninverting input terminal of the inverting amplifier IA2. An amplification factor of the inverting amplifier IA2 needs to be the same as a gain given to the adder A2 by the voltage signal VP, in which case the amplification factor is 1. Due to this, an output signal delivered from the inverting amplifier IA2 corresponds to VOUT−VP'. At the adder A2, VOUT−VP' is added to the voltage signal VP, and VOUT+(VP−VP') is inputted to the inverting input terminal of the comparator CMP1.

(VP−VP') is an AC voltage signal component representing the variation component of the coil current. A signal obtained by adding the output voltage VOUT to the variation component of the coil current is compared with the reference voltage E1 to thereby execute switching control.

With the DC-to-DC converter control circuit 2, the reference voltage signal VP' for detecting the variation component of the coil current is outputted by the low-pass filter LP2, and is inverted against the output voltage VOUT at the inverting amplifier IA2, so that it is possible for the adder A2 to detect the variation component of the coil current, (VP−VP'), converted in terms of voltage, by subtracting the reference voltage signal VP' from the voltage signal VP. The comparator CMP1 can compare an add-up voltage obtained by adding the output voltage VOUT to the variation component of the coil current, (VP−VP'), converted in terms of voltage, with the reference voltage E1. By so doing, the switching control can be executed by comparing the voltage signal varying according to the coil current on the basis of the output voltage VOUT as a bottom voltage with the reference voltage E1. Even in the case where the smoothing capacitor C1 has the equivalent series-connected resistance ESR at a small value, and a ripple voltage is reduced, the variation component of the coil current can be detected, and the switching control can be implemented with accuracy.

Figure 4:
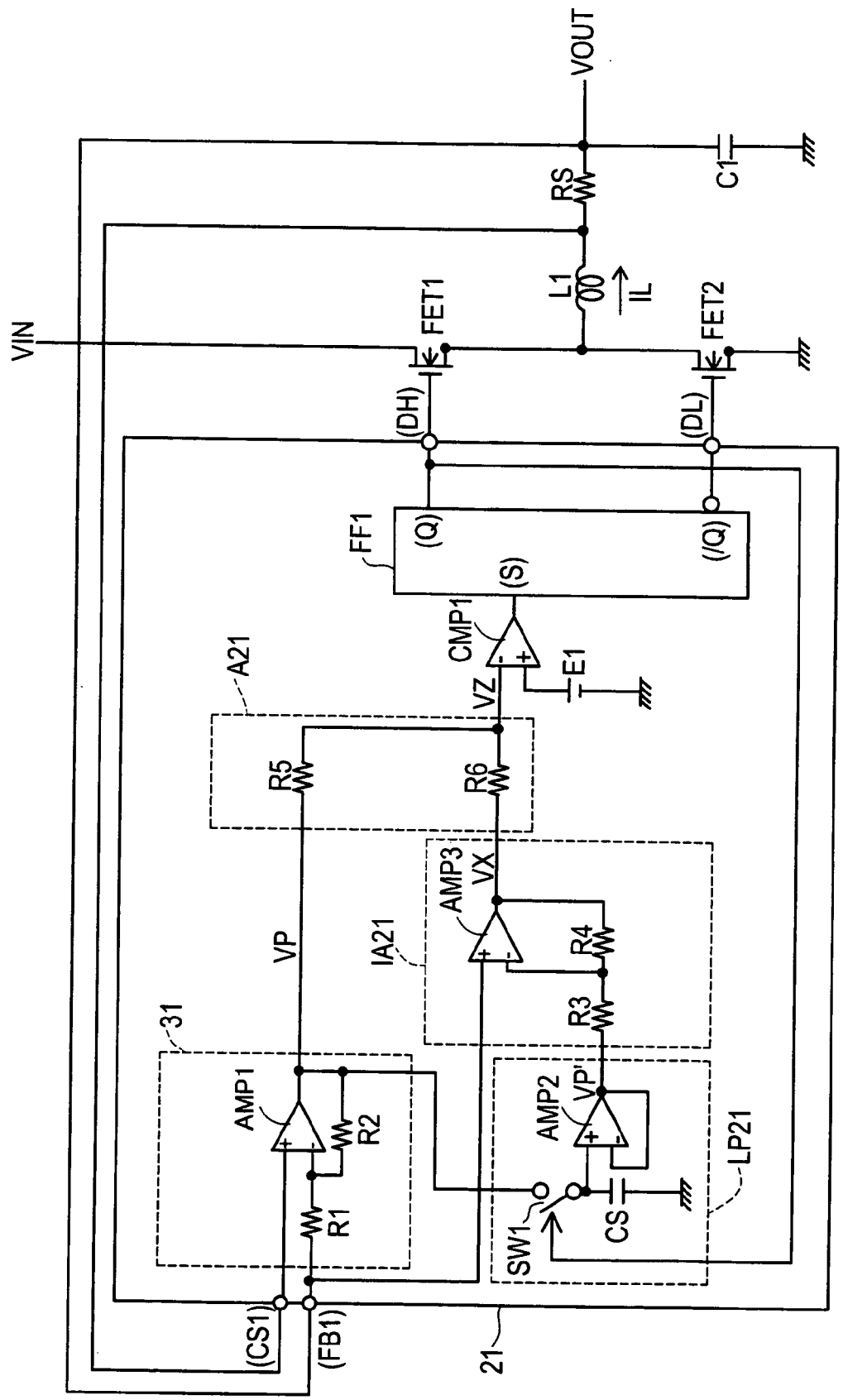
FIG. 4 is a circuit diagram showing a second embodiment of the invention, embodying the second principle.

FIG. 4 shows a circuit diagram of a second embodiment of the invention, embodying the second principle (FIG. 3). With a DC-to-DC converter control circuit 21, there are provided a sampling circuit LP21 as an example of the low-pass filter LP2 in the case of the second principle, an inverting amplifier IA21 as an example of the inverting amplifier IA2, and an adder A21 as an example of the adder A2. In addition, there is provided a noninverting amplifier 31 for amplifying a voltage signal VP against a signal inputted to an input terminal (CS1) before outputting the same.

The noninverting amplifier 31 is a common noninverting amplifier made up of an amplifier AMP1, and resistors R1, R2. Assuming that respective resistance values of the resistors R1, R2 are R1, R2, the noninverting amplifier 31 has a gain G=1+R2/R1. An output voltage VOUT is inputted to the resistor R1 via an input terminal (FB1). The output voltage VOUT can be deemed as a DC signal component of variation in a coil current, due to a switching action. Accordingly, on the assumption that respective input voltages at the input terminals (CS1), (FB1) are VCS1, VFB1, and the coil current is IL, the voltage signal VP outputted from the noninverting amplifier 31 is given by the following formula:

$$VP = VOUT + G \times (VCS1 - VFB1) = VOUT + G \times IL \times RS \quad (1)$$

The sampling circuit LP21 is provided with an amplifier AMP2 of a voltage follower configuration, and a noninverting input terminal of the amplifier AMP2 is connected to a connection point between a capacitor CS interconnecting the noninverting input terminal and the ground potential, and a switch circuit SW1 interconnecting the noninverting input terminal and an output terminal of the noninverting amplifier 31. The switch circuit SW1 is connected to a Q output terminal (Q) of a one-shot flip-flop circuit FF1 to be thereby controlled. The switch circuit SW1 is turned into conductive state within a time period sufficiently shorter than fixed on-time of the one-shot flip-flop circuit FF1 after the Q output terminal (Q) is inverted to the high-level. Accordingly, the capacitor CS captures the voltage signal VP at a point in time when a main transistor FET1 is turned into conductive state. Upon completion of a conductive-period of a synchronous transistor FET2, a switching cycle is completed. At this point in time, the coil current IL is at its bottom value. The capacitor CS retains the voltage signal VP at a point in time when the coil current IL reaches the bottom value in a preceding switching cycle. The voltage signal VP described serves as a reference voltage signal VP' for a subsequent switching cycle.

The inverting amplifier IA21 is a common inverting amplifier made up of an amplifier AMP3, and resistors R3, R4. A resistance ratio of the resistors, R3 to R4, is 1:1 in order to have a gain at 1 as previously described. The output voltage VOUT is inputted to a noninverting terminal of the amplifier AMP3 via the input terminal (FB1). A voltage signal VX outputted from the inverting amplifier IA21 is expressed by the following formula:

$$\begin{aligned} VX &= (VOUT - VP') + VOUT \quad (2) \\ &= 2 \times VOUT - VP' \\ &= 2 \times VOUT - (VOUT' + G \times IL' \times RS) \end{aligned}$$

where VOUT', and IL' are an output voltage, and a coil current, respectively, at a point in time when a preceding switching cycle is completed. The coil current at that time is at its bottom value.

The adder A21 is made up of resistors R5, and R6. A resistance ratio of the respective resistors is 1:1. An output voltage VZ of the adder A21 becomes an averaged voltage between the voltage signal VP and a voltage signal VX.

$$VZ = (VP + VX)/2 \qquad (3)$$
$$= \{(VOUT + G \times IL \times RS) +$$
$$(2 \times VOUT - (VOUT' + G \times IL' \times RS))/2$$
$$= VC1 + IL \times ESR + (IL - IL') \times (G \times RS + ESR)/2$$

In this case, in deriving the expression (3) as above, advantage has been taken of a fact that respective output voltages of adjacent switching cycles are the same (VOUT=VOUT'), and VOUT=VC1+IL×ESR on the assumption that a terminal voltage of the smoothing capacitor C1 is VC1, and an equivalent series-connected resistance is ESR. In this connection, the third term of the expression (3), that is, (IL−IL')×(G×RS+ESR)/2 corresponds to the variation component of the coil current, (VP−VP'), converted in terms of voltage, as described in connection with the second principle (FIG. 3). Further, as it need only be sufficient that the expression (3) holds, it is completely natural that the resistance ratio of the resistors, R3 to R4, and a resistance ratio of the resistors, R5 to R6, can be changed to 1:2, respectively.

Thus, the variation component (IL−IL') of the coil current is multiplied by a factor (G×RS+ESR)/2, thereby voltage comparison with the reference voltage E1 being executed by the comparator CMP1. Because the gain G can be adjusted by the noninverting amplifier 31, it is possible to obtain a large voltage variation in comparison with a voltage variation obtained as the ripple voltage, in the case where the variation component (IL−IL') of the coil current flows into the equivalent series-connected resistance ESR. With the conventional comparator control method, signal amplification in a front-end stage cannot be, in principle, implemented, however, with the present method, the voltage variation obtained is large, so that a response speed of the comparator CMP1 is rendered higher, and even in the case of using a smoothing capacitor C1 having the equivalent series-connected resistance ESR at a low resistance value, it is possible to implement a fast operation featuring the comparator control method.

Since the bottom value IL' of the coil current IL, in the preceding switching cycle, is used for detection of the variation component (IL−IL') of the coil current IL, the variation component (IL−IL') of the coil current IL is increased in value in the initial stage of a transient state at the time of a sudden change in load, thereby enabling a fast response operation in the case of the comparator control method to be implemented. Because the variation component (IL−IL') of the coil current IL is decreased in value in the completion stage of the transient state at the time of the sudden change in load, the fast response operation in the case of the comparator control method is deterred, so that supply, or discharge of the coil current IL, in relation to an output terminal VOUT, can be suppressed. Further, it is possible to deter overshooting and ringing phenomenon of the output voltage VOUT, in the completion stage of transient response, so that convergence performance of the output voltage VOUT, against the sudden change in load, can be improved.

Figure 5:
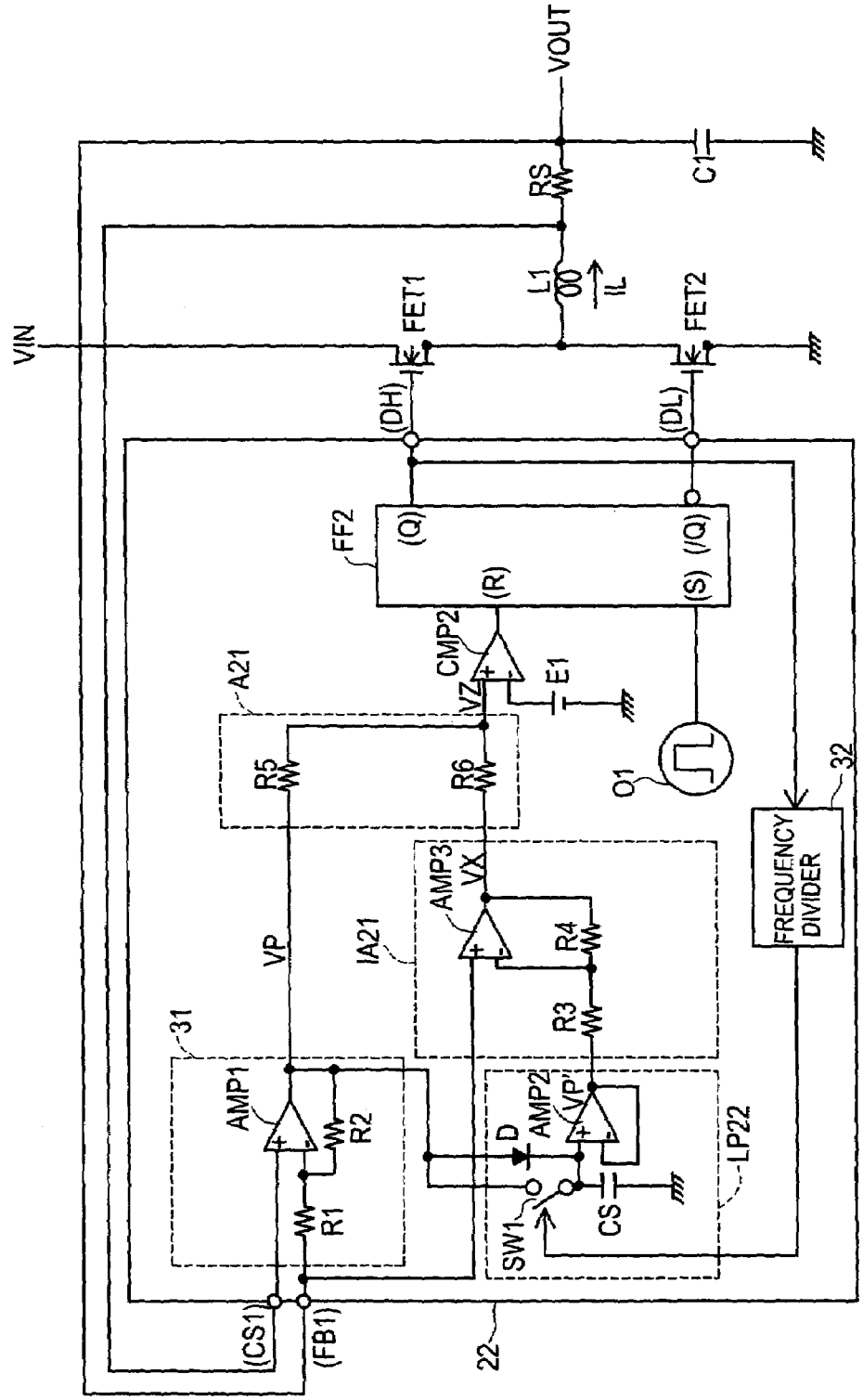
FIG. 5 is a circuit diagram according to a first variation example of the second embodiment of the invention.
Figure 7:
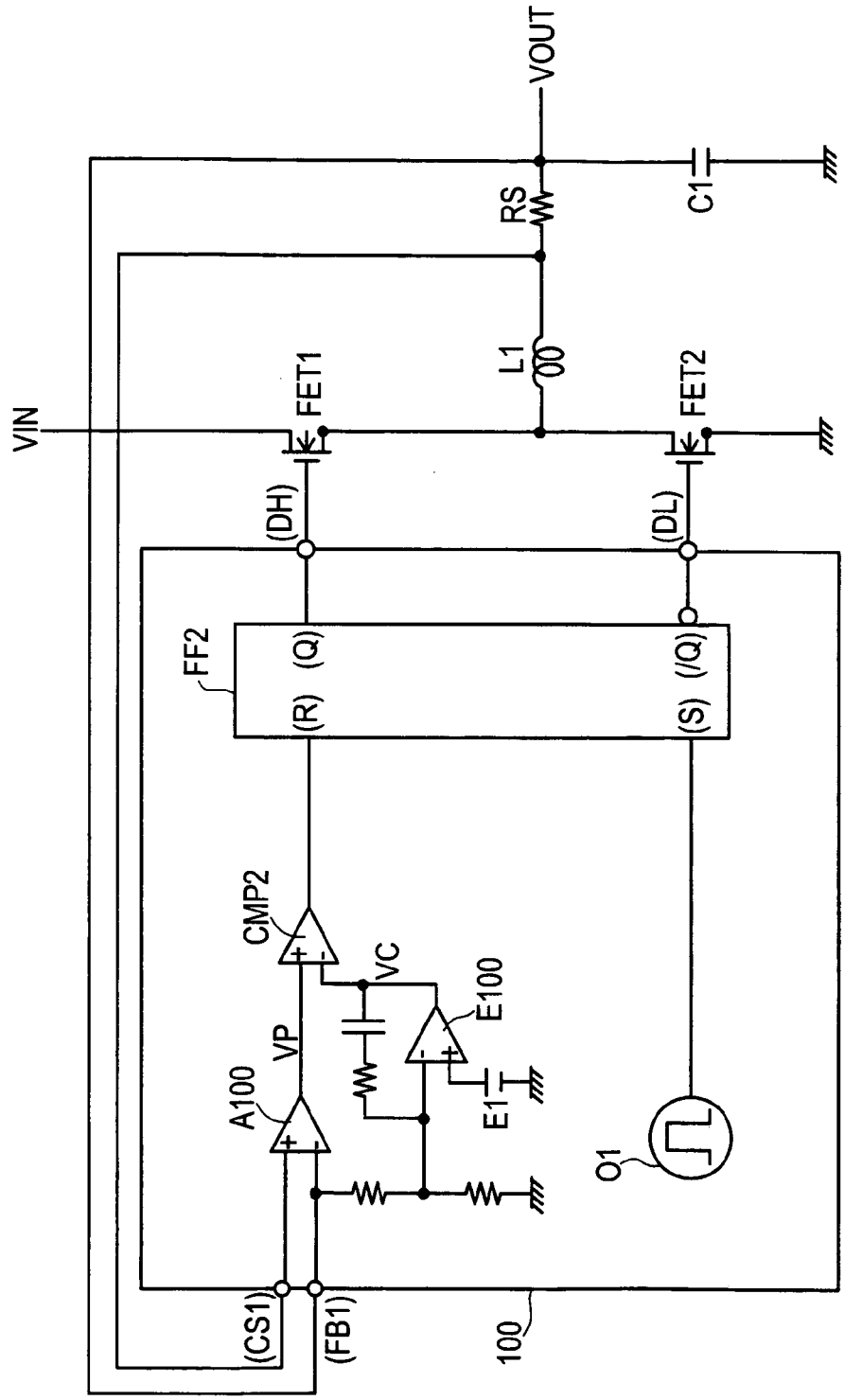
FIG. 7 is a circuit diagram (1) showing a background technology.
Figure 8:
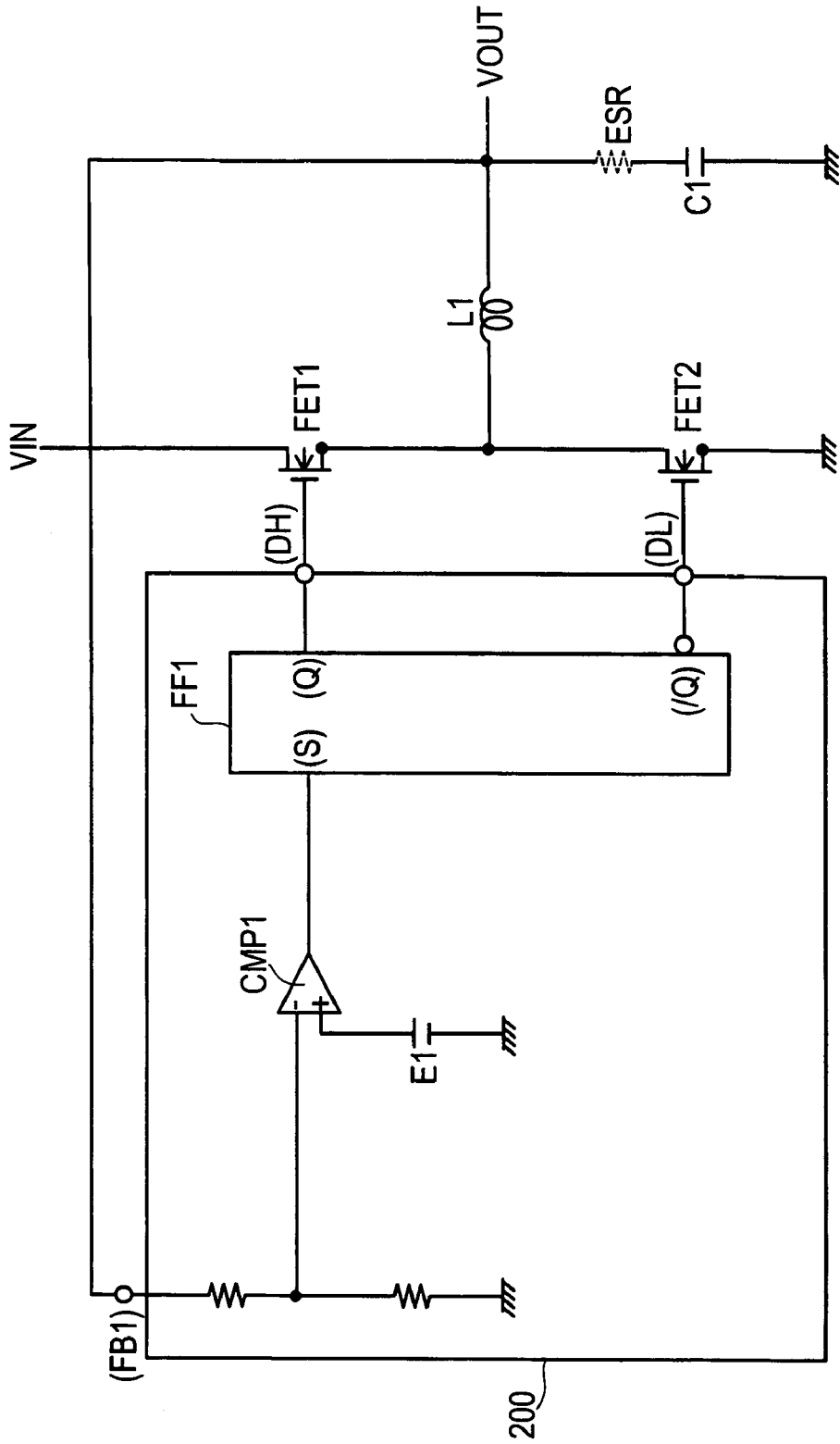
FIG. 8 is a circuit diagram (2) showing another background technology.

FIG. 5 shows a first variation example of the circuit according to the second embodiment of the invention. In contrast with the circuit of the fixed pulse width method, shown in FIG. 4, the first variation example shows a DC-to-DC converter of the frequency fixing method. As compared with the current control type DC-to-DC converter shown in FIG. 7, the first variation example is not provided with the error amplifier, and is capable of fast response in a bandwidth of an oscillation frequency of a built-in oscillator. With a DC-to-DC converter control circuit 22, there are provided a sampling circuit LP22, a comparator CMP2, and a flip-flop circuit FF2 having a set terminal (S) and a reset terminal (R), in place of the sampling circuit LP21, the comparator CMP1, and the one-shot flip-flop circuit FF1, in the case of the DC-to-DC converter control circuit 21 (FIG. 4), respectively. Further, in addition to those constituents of the DC-to-DC converter control circuit 21, there are also provided a frequency divider 32, and an oscillator O1.

With the DC-to-DC converter control circuit 22, connection of an output terminal of an adder A21 to the comparator CMP2, and connection of a reference voltage E1 to the comparator CMP2 are reversed from those in the case of the DC-to-DC converter control circuit 21. Further, an output terminal of the comparator CMP2 is connected to the reset terminal (R) of the flip-flop circuit FF2. The set terminal (S) of the flip-flop circuit FF2 is connected to the oscillator O1.

More specifically, the flip-flop circuit FF2 is set by the oscillator O1 for every predetermined oscillation cycle, whereupon the conductive state of a main transistor FET1 is started. The comparator CMP2 detects that a peak value outputted from the adder A21 coincides with the reference voltage E1, thereby resetting the flip-flop circuit FF2, and turning the main transistor FET1 into nonconductive state.

A noninverting amplifier 31, an inverting amplifier IA21, and the adder A21 are identical in configuration, and action to those of the DC-to-DC converter control circuit 21 (FIG. 4), corresponding thereto, omitting therefore description thereof herein.

The sampling circuit LP22 is provided with a diode D in parallel with a switch circuit SW1, in addition to those constituent members of the sampling circuit LP21. Conductivity of the switch circuit SW1 is controlled according to an output signal from the frequency divider 32. A signal from an output terminal (Q) of the flip-flop circuit FF2 undergoes frequency division before being supplied.

With the DC-to-DC converter control circuit 22, the frequency fixing method as with the current control type DC-to-DC converter is adopted, however, there is no need for installing the error amplifier. With the error amplifier, the frequency characteristics of the error amplifier need to be set to a bandwidth of, for example, not more than $\frac{1}{10}$ of the oscillation frequency in order to implement a stable switching action, however, with the use of the sampling circuit LP22, sampling is executed at an oscillation cycle, or a cycle divided by the frequency divider 32 in the case of this example, thereby enabling fast response in the bandwidth of the oscillation cycle to be implemented.

With the sampling circuit LP22, sampling of the voltage signal VP is not executed for every switching cycle, but executed for every cycle divided by the frequency divider 32. In the case of, for example, $\frac{1}{2}$ frequency dividing, the sampling action is executed once every two switching cycles. By so doing, it is possible to prevent a phenomenon in which the output voltage undergoes oscillation for every $\frac{1}{2}$ frequency dividing of a switching cycle when the current control type DC-to-DC converter is caused to make fast response.

Further, at the time of a sudden change in the output voltage VOUT, such as a time when power is turned on, and so forth, if sampling is executed using the voltage signal VP in a preceding switching cycle as the reference voltage signal VP' for a subsequent switching cycle, it is not possible to correctly derive the variation component of the coil current IL. That is because the output voltage VOUT, meanwhile, undergoes a large change, and consequently, a detected value of the variation component of the coil current IL comes out as a value larger than the actual value thereof. Accordingly, the current control type DC-to-DC converter comes to make fast response faster than necessary during a transient response, raising the risk of inducing phenomenon of the output voltage VOUT overshooting, ringing, and so forth, to thereby deteriorate the convergence property of the output voltage VOUT.

For this reason, there is provided the diode D to serve as a clamping circuit of the reference voltage signal VP', thereby clamping a voltage variation width of the voltage signal VP, between adjacent sampling cycles, to a forward biased voltage of the diode D, that is, approximately 0.6 V. By so doing, it is possible to cause the reference voltage signal VP' to follow up variation in the output voltage VOUT, and to limit the variation component of the coil current IL, as detected, thereby improving the convergence property while maintaining fast response.

As described above, with the present example, both frequency fixing control easy in establishing countermeasures against noise, and fast response as with the case of the comparator control method are concurrently implemented.

Figure 6:
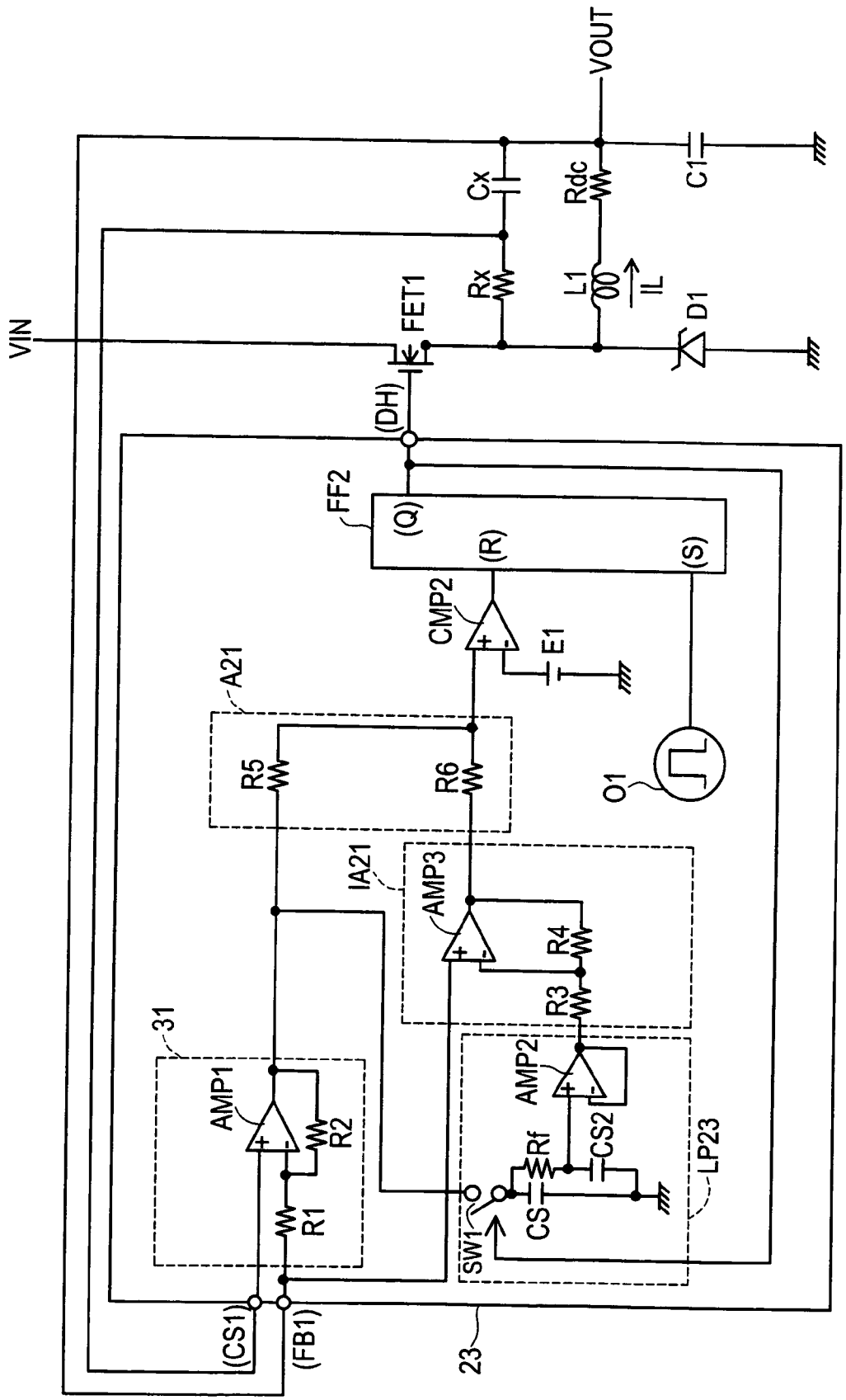
FIG. 6 is a circuit diagram according to a second variation example of the second embodiment of the invention.

FIG. 6 shows a second variation example of the circuit according to the second embodiment of the invention. The second variation example shows a current control type DC-to-DC converter provided with a diode D1 in place of the synchronous transistor FET2 of the first variation example (FIG. 5), employing an asynchronous rectification method, by way of example. Further, in place of the sense resistor RS, a resistor Rx coupled in series to a capacitor Cx are provided in parallel with a choke coil L1. Herein, resistance Rdc indicates a DC resistance component of the choke coil L1.

A DC-to-DC converter control circuit 23 is provided with a sampling circuit LP23, and a low-pass filter built therein, made up of a resistor Rf, and a capacitor CS2, in place of the sampling circuit LP22, and the frequency divider 32, provided in the DC-to-DC converter control circuit 22 (FIG. 5). An input terminal CS1 is connected to a connection node between the resistor Rx and the capacitor Cx.

With the second variation example, the resistor Rx and the capacitor Cx are used for detection of a coil current IL. There is adopted a known method capable of eliminating needs for the sense resistor RS, and detecting the coil current IL with a minimum loss due to the DC resistance component Rdc. If temperature variation of the DC resistance component Rdc is disregarded, it is known that the coil current IL can be correctly detected provided that $L1/Rdc=1/Rx/Cx$.

In this form, a large error occurs if there is an input current at the input terminal (CS1). Accordingly, by making up an input stage, and so forth, of an amplifier AMP1 of a noninverting amplifier 31, with a device high in input resistance, such as a MOS transistor, and so forth, the input current can be disregarded to thereby reduce error.

Further, in case the input current at the input terminal (CS1) cannot be disregarded, an error otherwise would occur to the coil current IL, due to the input current flowing into the resistor Rx, however, the coil current containing the error is amplified by the noninverting amplifier 31, and is subjected to sampling by the sampling circuit LP23, resulting in mutual subtraction. Accordingly, in this case as well, the errors are offset in the output of an adder A21.

The sampling circuit LP23 comprises the resistor Rf connected in series to the capacitor CS2, making up the low-pass filter, coupled in parallel with a capacitor CS, in addition to the sampling circuit LP21 (FIG. 4) serving as a base of the sampling circuit. A connection node between the resistor Rf and the capacitor CS2 is connected to a noninverting input terminal of an amplifier AMP2.

Assuming that the capacitors CS, and CS2 each have an identical capacitance (CS), time constant τ of a signal as sampled by a switch circuit SW1 is $\tau=2\times\pi\times Rf\times CS$. By setting the time constant τ shorter than a switching cycle of the DC-to-DC converter, but longer than sampling time, a reference voltage signal VP' outputted from the amplifier AMP2 can be rendered at an intermediate value between one in an immediately preceding switching cycle and one in a switching cycle preceding thereto, so that the reference voltage signal VP' can be rendered a filtered and averaged signal.

As described in detail in the foregoing, with the DC-to-DC converter control circuit according to the invention, and the DC-to-DC converter control method using the same, even if the equivalent series-connected resistance ESR of the smoothing capacitor C1, connected to the output terminal VOUT of the DC-to-DC converter, is reduced, and the voltage ripple superimposed on the output voltage VOUT becomes very small in value, it is possible to detect variation in the coil current IL of the DC-to-DC converter, thereby obtaining the add-up signal VZ obtained by adding the variation component (IL−IL') of the coil current IL to the output voltage VOUT. By comparing the add-up signal VZ with the reference signal E1, variation in the coil current IL, due to a change in load, can be captured with reliability.

Because the add-up signal VZ is outputted according to the variation component (IL−IL') of the coil current IL, there is an increase in difference between the add-up signal VZ and the reference signal E1 in the initial stage of a sudden change in load, so that switching control rapidly responding to the sudden change in load is executed. As the coil current IL, and the output voltage VOUT approach respective target values, so decreased is a difference between the add-up signal VZ and the reference signal E1, and transient switching control becomes gradual by degrees. In coincidence with a steady state as reached, the transient switching control comes to an end, thereby enabling a phenomenon of the output voltage VOUT overshooting in a reverse direction, accompanied by the ringing phenomenon of the output voltage VOUT, to be prevented.

In case a change in load is very steep so that a switching duty becomes 100%, or 0%, it is impossible to execute sampling of the reference voltage signal VP' because there is no peak point in the coil current IL. In this case, as the coil current IL is following up at the maximum speed, an earlier compensatory action is required in order to suppress the phenomenon of the output voltage VOUT overshooting, and ringing. With the present invention, the reference voltage signal VP' after sampling is the voltage signal VP in a switching cycle before the switching duty is turned to 100%, or 0%. As a result, the variation component (IL−IL') of the coil current IL will be estimated at a smaller value, thereby relieving the fast responsiveness, and improving the convergence property of the output voltage VOUT. Thus, the phenomenon of the output voltage VOUT overshooting, and ringing can be deterred without the necessity of an additional circuit.

It is to be pointed out that the present invention is not limited to the embodiments described hereinbefore, and that various improvements and variations may obviously be made without departing from the spirit or scope of the present invention.

With the present invention, the gain of the variation component (IL−IL') of the coil current IL corresponds to the term of (G×RS). By optimizing the gain against application conditions such as load capacitance, and so forth, it is possible to aim at stability and speed-up of a system as a whole. For example, a resistance value of the sense resistor RS may be altered depending on the application conditions. Further, in the case where the sense resistor RS is at a particularly low resistance value, and flexibility in selection is limited, the resistors R1, R2 may be selectively changed over by an additional switch circuit (not shown). By doing so, the gain of the variation component (IL–IL') of the coil current IL can be adjusted.

Still further, the first and second variation examples (FIG. 5, FIG. 6) are described by taking an example where a top value of the coil current IL is detected, however, the bottom value thereof may be detected instead.

Yet further, the case of the output voltage VOUT being connected to the inverting amplifier IA21 is shown by way of example, however, the reference voltage E1 in place of the output voltage VOUT may be connected thereto.

With the present invention, it is possible to provide a DC-to-DC converter control circuit capable of securing fast response characteristics for responding to a sudden change in load at high speed while aiming at implementation of an output voltage with a low ripple voltage by use of a smoothing capacitor having the equivalent series-connected resistance ESR at a very small value, and causing the output voltage to be rapidly converged toward a target voltage without occurrence of the phenomenon of the output voltage VOUT overshooting, and ringing, accompanying fast response, and a DC-to-DC converter control method using the same.

What is claimed is:

1. A DC-to-DC converter control circuit comprising:
   an arithmetic circuit for outputting an add-up signal generated by adding an output voltage signal obtained according to an output voltage of a DC-to-DC converter, and an AC current signal obtained according to an AC current component of a coil current;
   a comparator for comparing the add-up signal with a reference signal; and
   a reference signal circuit for retaining a DC current component of a coil current signal as an another reference signal, on the basis of a detection signal obtained by adding the coil current signal according to the coil current containing the DC and AC current components to the output voltage signal,
   wherein the arithmetic circuit comprises an inverting amplifier for inverting a signal variation component of the output voltage signal, at the another reference signal, and adding the same to the output voltage signal, and an adder for adding the detection signal to an output signal from the inverting amplifier, and wherein switching control is executed according to a result of comparison by the comparator.

2. A DC-to-DC converter control circuit according to claim 1, further comprising a high-pass filter for extracting the AC current signal.

3. A DC-to-DC converter control circuit according to claim 2, wherein the arithmetic circuit comprises an adder for adding the AC current signal outputted from the high-pass filter to the output voltage signal.

4. A DC-to-DC converter control circuit according to claim 1, wherein the reference signal circuit comprises a sample hold circuit, and a switch circuit for capturing a value of the detection signal into the sample hold circuit in a preceding switching cycle of the DC-to-DC converter.

5. A DC-to-DC converter control circuit according to claim 4, wherein the switch circuit captures a value of the detection signal in a switching cycle preceding to the present switching cycle by one switching cycle.

6. A DC-to-DC converter control circuit according to claim 4, further comprising a clamping circuit connected in parallel with the switch circuit, for limiting a drop amount of the reference signal, against the detection signal.

7. A DC-to-DC converter control circuit according to claim 4, wherein the switch circuit captures the detection signal at the time of detection by comparison in the DC-to-DC converter or at a time immediately thereafter.

8. A DC-to-DC converter control circuit according to claim 4, wherein the switch circuit captures the detection signal in a switching cycle preceding to the present switching cycle by at least two switching cycles.

9. A DC-to-DC converter control circuit according to claim 4, further comprising a frequency divider for dividing a switching control signal of the DC-to-DC converter, wherein the switch circuit is controlled by an output signal of the frequency divider.

10. A DC-to-DC converter control circuit according to claim 4, wherein the sample hold circuit comprises a first capacitor for capturing the detection signal, and a low-pass filter coupled to the first capacitor, and the reference signal is given from an output of the low-pass filter.

11. A DC-to-DC converter control circuit according to claim 10, wherein the sample hold circuit comprises a time-constant circuit parallel-coupled to the first capacitor, including a second capacitor, and the reference signal is retained by the second capacitor.

12. A DC-to-DC converter control circuit according to claim 1, wherein the reference signal circuit comprises a low-pass filter with the detection signal inputted thereto.

13. A DC-to-DC converter control circuit according to claim 1, further comprising a noninverting amplifier for amplifying a variation component of a signal for the output voltage, based on an original signal obtained by adding a voltage component of the coil current to the output voltage, and adding the variation component to the output voltage, wherein the detection signal is an output signal from the noninverting amplifier.

14. A DC-to-DC converter control method comprising:
    adding an output voltage signal obtained according to an output voltage of a DC-to-DC converter and an AC current signal obtained according to an AC current component of a coil current;
    retaining an another reference signal of the AC current signal, on the basis of a detection signal obtained by adding the coil current signal according to the coil current containing the DC and AC current components to the output voltage signal;
    comparing an addition result of the step of adding the output voltage signal with a reference signal; and
    executing switching control according to a comparison result of the step of comparing the addition result,
    wherein the addition comprises:
    inverting a signal variation component of the another reference signal according to the output voltage signal;
    adding the signal variation component to the output voltage signal; and adding the detection signal to a signal obtained by the adding the signal variation component.

15. A DC-to-DC converter control method according to claim 14, wherein the step of retaining the reference signal comprises a step of capturing a value of the detection signal as the reference signal in a preceding switching cycle of the DC-to-DC converter.

16. A DC-to-DC converter control method according to claim 15, wherein the step of capturing the value of the detection signal is taken in a switching cycle preceding the present switching cycle by one switching cycle.

17. A DC-to-DC converter control method according to claim 15, wherein the step of capturing the value of the detection signal is taken in a switching cycle preceding the present switching cycle by at least two switching cycles.

18. A DC-to-DC converter control method according to claim 15, wherein the step of retaining the reference signal further comprises a step of further averaging the detection signal as captured and a mean value of the detection signals already captured and retained prior thereto.

* * * * *